United States Patent [19]

Hampel et al.

[11] Patent Number: 4,483,017
[45] Date of Patent: Nov. 13, 1984

[54] PATTERN RECOGNITION SYSTEM USING SWITCHED CAPACITORS

[75] Inventors: Daniel Hampel, Westfield, N.J.; John L. Bradshaw, Hatboro, Pa.

[73] Assignee: RCA Corporation, New York, N.Y.

[21] Appl. No.: 288,685

[22] Filed: Jul. 31, 1981

[51] Int. Cl.³ .............................................. G06K 9/00
[52] U.S. Cl. .................... 382/17; 343/55 A; 367/43; 382/36
[58] Field of Search ................. 382/17, 29, 36; 367/7, 367/32, 43, 49, 21, 22; 179/1 SA, 1 SD; 364/421; 343/55 A, 55 FT; 333/166, 172; 381/45, 49, 50

[56] References Cited

U.S. PATENT DOCUMENTS

| | | | |
|---|---|---|---|
| 3,180,445 | 4/1965 | Schwartz et al. | 367/43 |
| 3,319,229 | 5/1967 | Fuhr et al. | 382/29 |
| 3,421,141 | 1/1969 | Meyerhoff | 364/421 |
| 4,001,820 | 1/1977 | Rosenbaum et al. | 343/55 A |
| 4,028,673 | 6/1977 | Taylor et al. | 382/17 |
| 4,389,647 | 6/1983 | Fanuele et al. | 343/55 A |

Primary Examiner—Leo H. Boudreau
Attorney, Agent, or Firm—Joseph S. Tripoli; George E. Haas; Henry I. Schanzer

[57] ABSTRACT

A pattern recognition system includes a filter bank, coupled via rectifying elements to integrators which are coupled via different weighting elements to the summing nodes of a summing amplifier. The filter bank, integrators, and weighting elements include switched capacitors enabling the manufacture of the filters, rectifiers, integrators and weighting elements on a monolithic integrated circuit chip. The frequencies at which the capacitors are switched are programmable enabling the system to be easily "retuned".

11 Claims, 8 Drawing Figures

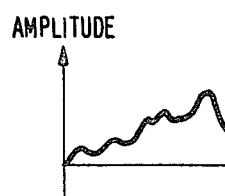
FIG.5A
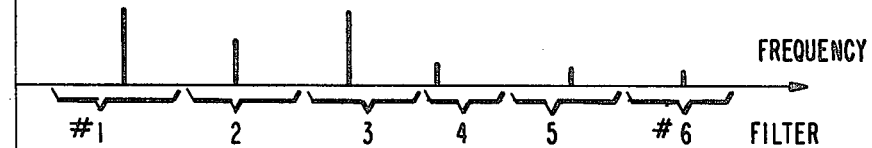
FIG.5B
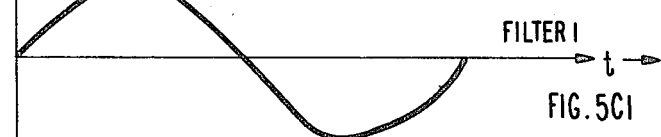
FIG.5C1
FIG.5C2
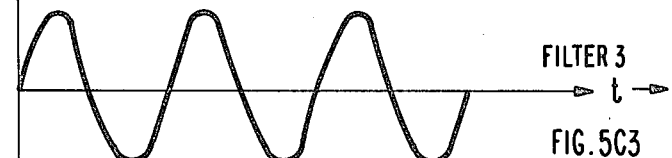
FIG.5C3
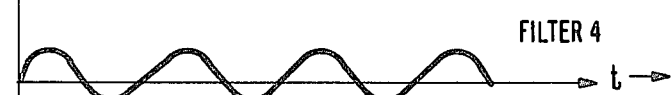
FIG.5C4
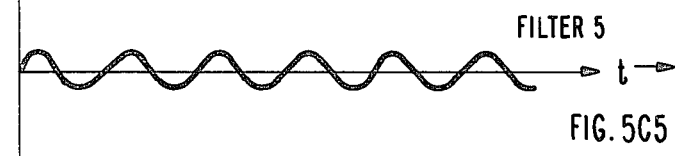
FIG.5C5
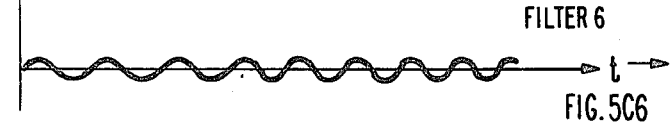
FIG.5C6

PATTERN RECOGNITION SYSTEM USING SWITCHED CAPACITORS

This invention relates to pattern recognition, or signal classifier, systems.

Pattern recognition systems are used, by way of example, for target identification in military systems, in bio-medical diagnostic systems, and in non-destructive testing systems for structural flaw analysis. Signal processing functions commonly performed by such systems include:

(1) analog conditioning (amplification and automatic gain control of an input signal);

(2) feature extraction (deriving the most meaningful characteristics or feature set of the input signal); and (3) discrimination (making decisions based on the derived feature set).

In the prior art these functions have been implemented with combinations of analog and digital systems which often are relatively bulky and complex and which may consume substantial power. To enable the systems to be battery powered and to decrease the cost of manufacture, as required in many of the military and commercial applications mentioned above, more power efficient and (physically) simpler classification techniques are required.

Systems embodying the invention include circuitry incorporating switched capacitor filters and switched capacitor techniques to perform many analog conditioning and classifier functions and to enable the manufacture of a flexible and versatile signal conditioning and analysis system.

In the accompanying drawing like reference characters denote like components and;

FIG. 5A is a representative input waveform to the system of FIG. 1;

FIG. 5B is the frequency spectrum of the waveform of FIG. 5A;

Figure 1:
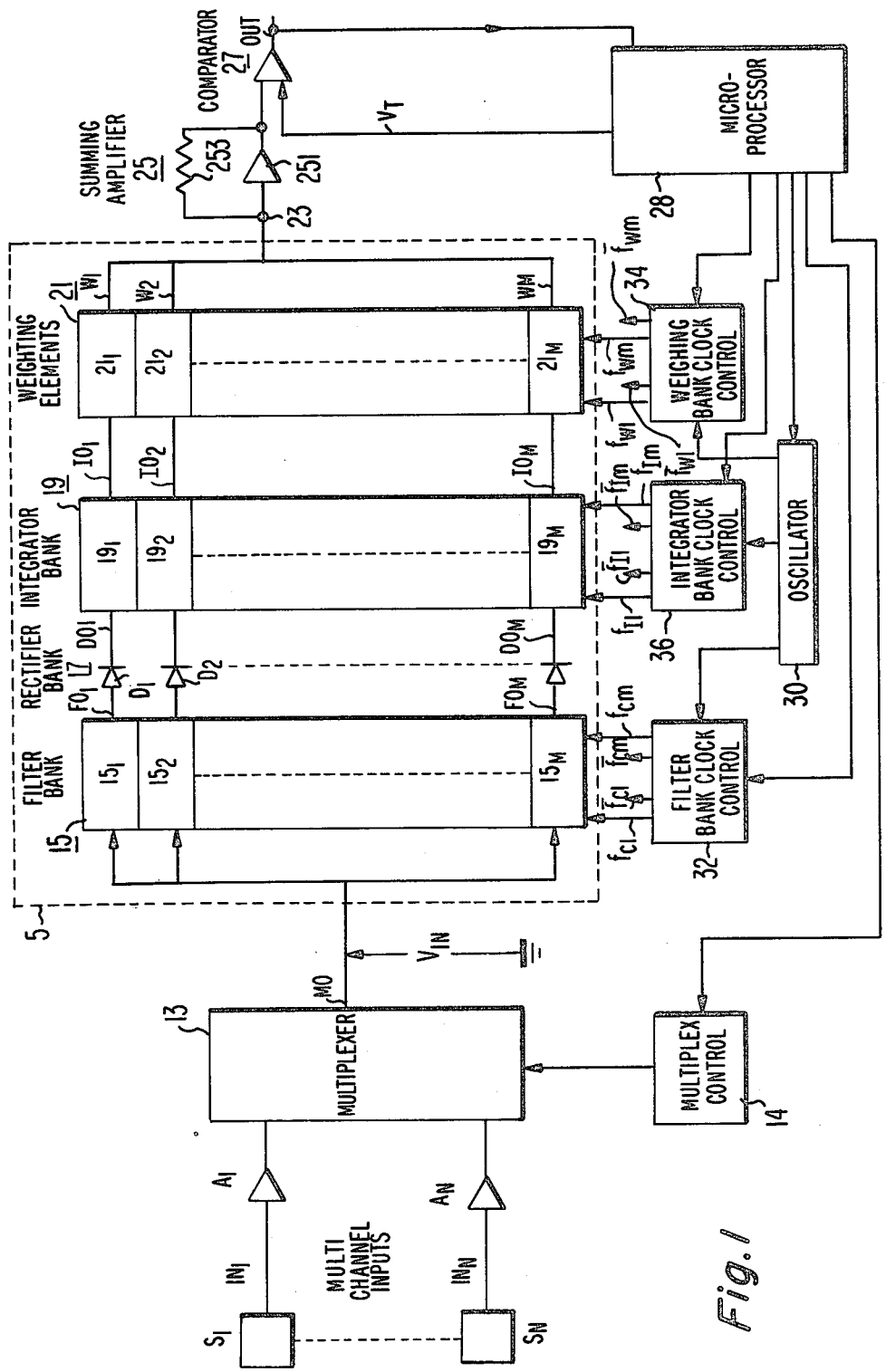
FIG. 1 is a block diagram of a system embodying the invention.
Figures 6A, 6B, 6C:
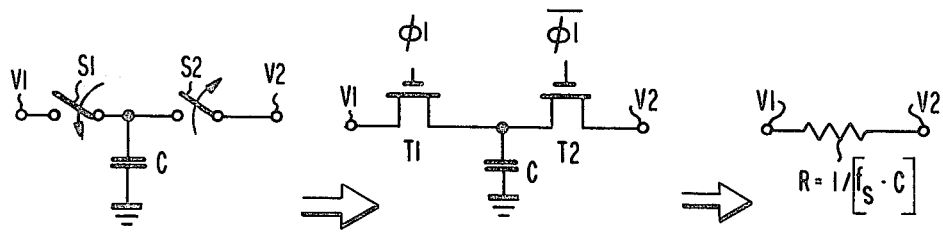

FIGS. 5C1, 5C2, 5C3, 5C4, 5C5, and 5C6 represent typical waveforms produced at the outputs of 6 filters of FIG. 1 in response to the waveform shown in FIG. 5A;

FIGS. 6A and 6B are schematic diagrams of prior art switched capacitor circuits, and FIG. 6C represents the equivalent resistance of the switched capacitor shown in FIGS. 6A and 6B.

To better understand the discussion of the system of FIG. 1 to follow and the importance of using switched capacitors to implement most of the functions of the system, it is in order to first briefly review the operation of the basic switched capacitor circuit.

A capacitor having one plate returned to a fixed point of potential and having its other plate switched between a signal input terminal and a second terminal at a frequency which is significantly higher than the signal frequency behaves as an equivalent resistor whose impedance is proportional to the frequency at which the capacitor is being switched. This is best explained by reference to FIGS. 6A, 6B and 6C.

Referring to FIG. 6A assume, initially, that a switch S1 is closed while a switch S2 is open so that a capacitor C is charged to a voltage V1 (which is the amplitude of an input signal). Assume that, subsequently, switch S1 is opened and switch S2 is closed whereby capacitor C is discharged to a voltage V2. The amount of charge (Q) which flows into or from V2 may be expressed as:

$$Q = C(V2 - V1) \tag{1}$$

Now if switches S1 and S2 are alternately opened and closed every $T_S$ seconds, then the current (I) flow into or out of V2 may be expressed as:

$$I = C(V2 - V1)/T_S \tag{2}$$

The value of an equivalent resistor (R), as shown in FIG. 6C, which would perform the same function as the switched capacitor (C) may be expressed as:

$$R = T_S/C \tag{3}$$

If $f_S$ which is defined as the sampling frequency, (i.e. the rate at which the switches S1 and S2 are opened and closed) is equal to $1/T_S$, and if $f_S$ is much greater than the signal frequencies, (i.e. the rate at which V1 and V2 change), then the time sampling of the signal which occurs in this circuit can be ignored and the switched capacitor can be considered as a direct replacement for a conventional resistor. The resistance value of the switched capacitor may then be expressed as:

$$R = 1/[f_S \cdot C] \tag{4}$$

Thus, a capacitor (C) which is switched at a sampling frequency ($f_S$) which is much higher than the input signal (V1) frequency appears as a frequency dependent resistor R having a value equal to $1/f_S C$. Switches S1 and S2 may be replaced my MOS transistors (T1, T2) as shown in FIG. 6B which are turned on and off by means of non-overlapping clock signals $\phi 1$ and $\overline{\phi 1}$ of frequency $f_S$, so that only one of the two transistors is turned on at any one time.

A significant advantage of a switched capacitor is that the stability and linearity of its equivalent resistance value is proportional to $1/f_S$ and (in an integrated circuit) is much better than that obtained from a diffused resistor since the insulator of the capacitor in a properly fabricated Metal-Oxide-Semiconductor (MOS) capacitor has essentially ideal characteristics. For example, typical temperature coefficients for the MOS capacitors are less than 10 parts per million. Another important advantage of employing switched capacitors instead of resistors is the high accuracy of the (equivalent) RC time constants that can be obtained with switched capacitors. If a capacitor $C_1$ which is switched at a clock rate of $f_S$ to form an equivalent resistor R1, is connected to a capacitor $C_2$, the resultant time constant ($R_1C_2$) of this network, (where $R1 = 1/f_S C_1$) is equal to:

$$\tau = R_1 C_2 = C_2/f_S C_1$$

For a given clock rate ($f_S$) the value of the time constant is, therefore, determined by a ratio of capacitor values which makes it insensitive to most processing variations. The capacitance of a unit area is generally uniform across an integrated circuit and it is, therefore, possible to achieve high precision in the capacitor ratio.

Therefore, it is highly desirable to employ switched capacitors to perform many of the functions needed in a pattern recognition system or a classifier system. In addition, as noted below, the use of switched capacitors enables the manufacture of a highly complex system on a single monolithic circuit.

The system of FIG. 1 includes N sensors ($S_1$ through $S_N$) where N may be any integer greater than one (1). The sensors may be any one, or a combination, of a number of transducers designed to respond to a variety of stimuli. Examples of sensors suitable for use in this application include acoustic microphones which have a frequency response of 20 Hz to 20 kHz; geophones with a frequency range of 5 Hz to 20 kHz; hydrophones with a range of 2 Hz to 10 kHz; and ultrasound microphones with a range above 100 kHz. The output of each sensor is coupled to the input of a corresponding amplifier ($A_1$ through $A_N$) which may be any known amplifier suitable to amplify and condition the transducer signals.

The outputs of amplifiers $A_1$ through $A_N$ are applied to the inputs of a multiplexer 13 which is controlled by a multiplexer control 14. The multiplexer control determines which one, or ones, of the amplifier outputs is coupled to the multiplexer output (MO) for further processing by the system. The multiplexer may be, for example, similar to the CD4051 or CD4067, manufactured by RCA Corporation, but any suitable multiplexer may be used instead. The multiplexer output ($V_{IN}$) is applied to a filter bank 15 which is comprised of M filters $15i$; where $1 \leq i \leq m$. Each one of the M filters is a switched capacitor band pass filter of the type shown in FIG 2. Each filter $15i$ is designed an operated to pick out or extract the amplitude component of $V_{IN}$ within a certain, preselected frequency band. This information is then used to determine the energy of $V_{IN}$ in the different frequency bands. Each filter $15i$ has an output (FOi) which is connected to the input of a corresponding rectifying circuit Di. Each rectifying circuit has an output DOi which is connected to the input of a corresponding integrator $19i$ in an intergrator bank 19. Each integrator $19i$ is a switched capacitor circuit of the type shown in FIG. 3 and functions to produce at its output IOi a direct current (D.C.) level proportional (the time integral) to the amount of energy present in the signal applied to its input. The operation of the integrators is detailed below. The output IOi of each integrator is connected via a weighting element $21i$ to the input 23 of a summing amplifier. Each weighting element is a switched capacitor circuit of the type shown in FIG. 4. The "ratioing" of the switched capacitor elements $21i$ to each other is important in maintaining the relative weights of the signals. All the integrator outputs IOi are weighed and summed at the input 23 of summing amplifier 25. The summing amplifier 25 includes an operational amplifier 251 and a resistor 253 connected between the output of amplifier 251 and its input 23. Resistor 253 in combination with the equivalent resistors of the switched capacitors in bank 21 determines the gain of the amplifier 25. The output ($V_0$) of the summing amplifier may be expressed as $V_0 = V_1 \cdot R_F/R_1 + V_2 \cdot R_F/R_2 \ldots V_M R_F/R_M$; when $R_F$ is the value of resistor 253 and $R_1, R_2 \ldots R_M$ are the values of the respective resistances of the $21i$ weighting elements. A final comparator stage 27 includes means for comparing the summing amplifier output with a controllable threshold ($V_T$). The comparison is used to determine the category or value of the input signal $V_{IN}$ being analyzed and to classify it.

The system of FIG. 1 also includes a microprocessor 28, an oscillator 30, a filter bank clock control circuit 32, a weighting clock control circuit 34; and an integrator bank clock control circuit 36.

The microprocessor may be any one of a number of known microcomputer control systems. The microprocessor provides control signals for the multiplexer control 14, the oscillator 30, the filter control 32, the weight control 34, and the integrator control 36. The microprocessor control signals are used to control (e.g. initiate) the operation of components 14, 30, 32, 34, and 36 and the range of frequency signals produced by components 30, 32, 34 and 36. Oscillator 30 and control circuits 32, 34, and 36 may be formed externally to the microprocessor, or may be part of the microprocessor.

The oscillator 30 generates high frequency signals which are coupled to filter control circuit 32, weight control circuit 34, and integrator control circuit 36. The filter control 32 produces M different switching signals ($f_{C1} \ldots f_{Cm}$) and their complements which are applied to the switches associated with the switched capacitors of a particular filter such that the switched capacitors of different filters in filter bank 15 can be operated at different frequencies. The integrator control circuit 36 also produces M different switching signals ($f_{I1} \ldots f_{Im}$) and their complements which are applied to the switches associated with the switched capacitors of a particular integrator such that the switched capacitors of different integrators may be operated at different frequencies.

Similarly, weight clock control 34 produces M different switching signals ($f_{W1} \ldots f_{Wm}$) and their complements which are applied to the switches associated with a particular "weighting" capacitor such that each capacitor in Bank 21 may be switched at a different frequency and provide a different weight factor.

The microprocessor also provides a threshold voltage ($V_T$) signal which is applied to one input of comparator 27. The output of the summing amplifier is applied to another input of the comparator. The comparator compares its two input signals to determine the classification of the input or target sensed by a particular sensor. The output of the comparator 27 is fed back to the microprocessor and/or to other utilization circuits (not shown.)

The microprocessor may be programmed, depending on the output fed back to the microprocessor or on other criteria or programs, to modify the oscillator frequency and thereby to modify accordingly the frequency of the signals supplied by controls 32, 34 and 36. The change in the frequency of the switching or sampling signals applied to the filter bank in effect "retunes" the filter bank. Changing the frequency of the sampling signals applied to the weighting elements also changes the weights associated with each feature of a signal to be selectively varied. Modifying the control signals produced by 32, 34, and 36 allows the basic classifier chip to be used for a wide variety of applications or to be updated as the feature discrimination logic is refined for improved performance. Also, a microprocessor program may be used to change classification criteria so as to set up a different target criteron. This is achieved by selectively varying the threshold voltage applied to the comparator. For simple classifiers the microprocessor may be replaced with pre-programmed logic and that together with the oscillator may be incorporated into a single monolithic chip. The microprocessor adds to the system the capability of a far more sophisticated classification algorithim and the ability to adapt a classifier system to a wide range of targets to be recognized and classified by software changes alone.

In the system of FIG. 1 the microprocessor need only perform control functions, while all the signal filtering and signal analysis is done by blocks 15, 17, 19, and 21, and amplifier 25. In contrast thereto many prior art systems rely on the microprocessor to perform both the control function and the signal filtering and analysis function. As so used in the prior art, the microprocessor samples a signal (snapshot fashion) and then processes it. This method is expensive in terms of the time required to analyze and classify signals. The prior art use of the microprocessor as a control and signal analyzer was dictated, in part, by the inability to easily manufacture a suitable filter rectifier, and integrator banks without use of extremely complex equipment requiring much space and power. The filter-rectifier-integrator arrangement disclosed in FIG. 1 enables signals to be processed and classified in real time while the microprocessor performs a control function (e.g. frequency and threshold voltage changes). It is significant that the circuitry shown in block 15, 17, 19, and 21 of FIG. 1 including amplifier 25 and comparator 27 can be formed on a single monolithic substrate as shown by means of dashed box 5 in FIG. 1. Thus, in systems embodying the invention the microprocessor does not have to spend time analyzing the data. The data can be analyzed in real time by the filter-rectifying-integrator and weighting element banks; all formed on a single monolithic substrate to provide a "classifier-on-a-chip".

Figure 2:
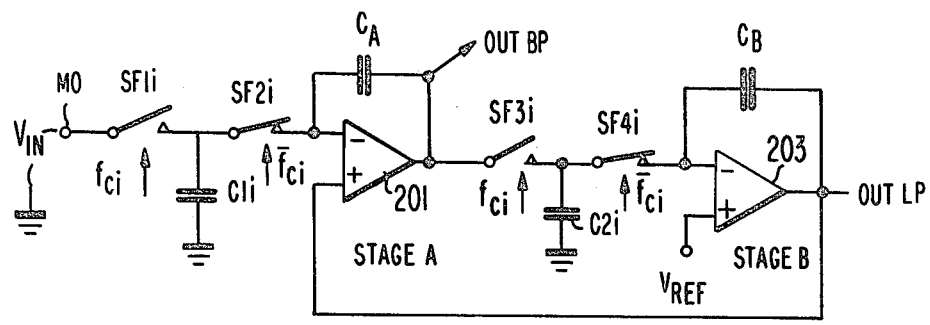
FIG. 2 is a schematic diagram of a switched capacitor filter suitable for use in the system of FIG. 1.

Each filter in $15i$ filter bank 15 includes a circuit of the type shown in FIG. 2. Each filter includes a capacitor C1i having one plate connected via a first switch SF1i to an input point MO (the multiplexer output) to which is applied the signal $V_{IN}$ and via a second switch SF2i to the inverting input (−) of an operational amplifier 201. A capacitor $C_A$ is connected between the output of amplifier 201 and its inverting input. A second capacitor C2i has one plate connected via a switch SF3i to the output of amplifier 201 and via a switch SF4i to the inverting input (−) of an operational amplifier 203. A capacitor CB is connected between the output of amplifier 203 and its inverting input. The non-inverting input (+) of amplifier 203 is returned to a point of reference potential ($V_{REF}$). The output of operational amplifier 203 is fed back to the non-inverting input (+) of amplifier 201. Switches SF1i and SF2i are operated (opened and closed) such that they are not both closed at the same time. Similarly, switches SF3i and SF4i are operated such that they are not both closed at the same time. As interconnected, stage A produces at its output a band pass (BP) output of the input signal applied at MO and stage B produces at its output a low pass (LP) output of the input signal applied at MO. The band pass (BP) signal produced at the output of amplifier 201 is similar to the output produced by cascading a low pass filter with a high pass filter. The operation of the circuit of FIG. 2 is described in a reference titled, MOS SAMPLED DATA RECURSIVE FILTERS USING SWITCHED CAPACITOR INTEGRATORS, *IEEE Journal of Solid State Circuits*, volume SC-12 No. 6, December, 1977 by Bedrich J. Hosticka et al. and need not be detailed. Suffice it to say that stage B is designed as a low pass filter having a cut off frequency $f_b$ which is determined in part by the ratio of capacitor CB to C2i. Stage A is designed to have a cut off frequency $f_a$ which is determined by the ratio of CA to C1i, and where $f_a$ is greater than $f_b$. For input signals having frequencies in the range of 0 to $f_b$ any signal getting through to the output of stage B is doubly inverted. That is, an input signal passing through Stage A and then through Stage B is then applied (with its original phasing) to the non-inverting input of Stage A. For frequencies ranging from 0 to $f_b$ the input signal and the feedback signal applied to the differential input of amplifier 201 are in phase and are generally of similar amplitude. Consequently, the signal output of Stage A to frequencies below $f_b$ will be significantly attenuated. Since the Stage B has a frequency cut off at $f_b$, signals applied to Stage B having a frequency greater than $f_b$ will be attenuated by stage B. Consequently, the components of $V_{IN}$ lying in the frequency range between $f_b$ and $f_a$ are passed to the output of stage A while signals outside the range $f_a-f_b$ are attenuated significantly. Thus, the output of Stage A is the band pass output of the filter. Filter circuits of the type shown in FIG. 2 may be cascaded so as to improve the sharpness of the filter characteristics (2 poles for every circuit of FIG. 2), or multipole filters may be designed.

By operating (opening and closing) the switches (SFi) of each filter at different frequencies or bands of frequencies, the energy component of each signal $V_{IN}$ within different frequency bands of interest can be determined.

Figure 3:
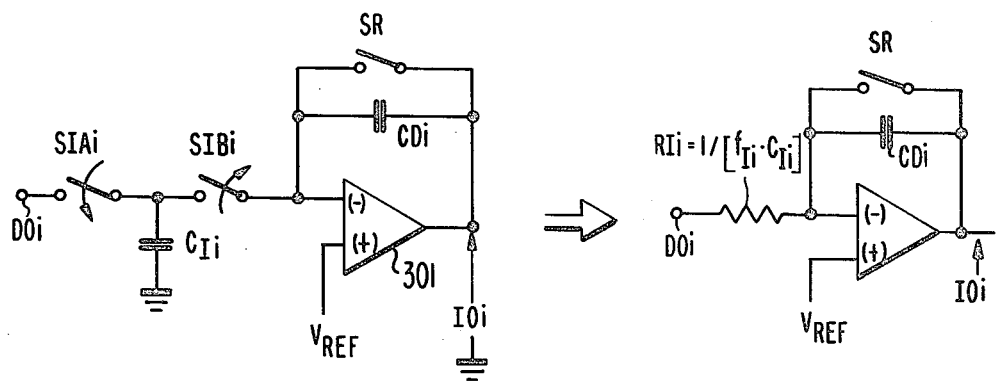
FIG. 3 is a schematic diagram of an integrator suitable for use in the system of FIG. 1.

Each integrator $19i$ as shown in FIG. 3 includes a capacitor CIi having one plate grounded and the other plate connected via a first switch SIAi to an input terminal DIi and via a second switch SIBi to the inverting terminal (−) of an operational amplifier 301. An integrating capacitor CDi is connected between the inverting input and the output of the amplifier 301. A switch SR is connected across capacitor CDi to selectively reset the integrator to some initial condition. A reference voltage ($V_{REF}$) is applied to the non-inverting input of the integrator.

The equivalent RC time constant of the integrator circuits is made relatively large to ensure that the signal produced at the output of each inverter is the time integral of the signal at its input. The system of FIG. 1 includes means for providing a separate switching signal ($f_{Ii}$) for switching each integrator CIi at a frequency $f_{Ii}$. In many applications the integrators could all be driven at the same frequency provided, as noted above, that the resulting time constant was sufficiently long for all values of input signals.

Figure 4:
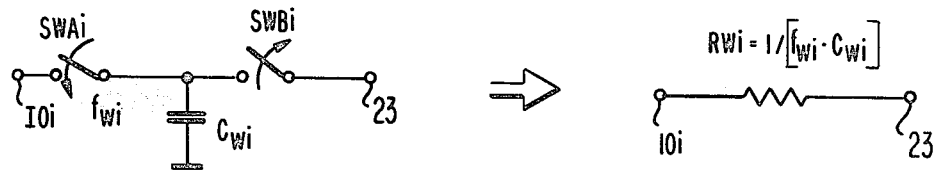
FIG. 4 is a diagram showing a switched capacitor suitable for use in the circuit of FIG. 1.

Each one of the weighting elements in block 21 includes a capacitor $C_{Wi}$ coupled via a switch SWAi, as shown in FIG. 4 to the output (IOi) of its integrator and via a switch SWBi to the summing node 23 of the summing amplifier. The rate at which SWAi and SWBi are opened and closed determines the value of the equivalent resistance of element $C_{Wi}$ between the integrator output IOi and summing node 23. That is, each weighting capacitor functions as a controllable resistor RWi of value equal to $1/[f_{Wi} \cdot C_{Wi}]$.

To better understand the function performed by the filter bank 15, assume that a transducer sensing a certain target produces a waveform whose amplitude varies as a function of time as shown in FIG. 5A. The frequency spectrum of the waveform of FIG. 5A may be as shown in FIG. 5B. The waveform of FIG. 5A is applied via the multiplexer 13 to the filter bank and appears as $V_{IN}$ to the input of each filter. The outputs of 6 different filters (which are typical of the M filters in filter bank 13) in response to waveform 5A are shown in FIGS. 5C1, 5C2, 5C3, 5C4, 5C5, 5C6.

The output (FOi) of each filter is then coupled via a rectifier circuit (Di) to the input of a corresponding integrator (19i). The signal input to each integrator is thus a rectified signal. The output IOi of each integrator will be a dc level proportional to the time integral (which represents the energy level) of the signal at its input.

The weighting elements in combination with the summing amplifier function to add to one another the signals at the outputs of the respective integrators after multiplying each signal by a weighting factor. This is done to ensure that the correct composite of frequency bands and signal amplitudes in the bands must be present in a signal to recognize a target. Thus, a recognition algorithm can be implemented with a single integrated circuit.

The circuitry in Blocks 15, 17, 19 and 21 may be formed on a monolothic integrated circuit chip. (Of course, additional portion of the system can also be formed on the same monolithic chip if there is sufficient room). The capacitors in the filter integrator and weighting banks range in value between a few picofarads and a few hundred picofarads. Capacitances of such values readily are formed on an integrated circuit without occupying too much space. The application to the switched capacitors of sampling or switching frequencies which can be varied over a wide frequency spectrum enables the switched capacitors to provide a wide range of equivalent resistance values with a very small valued capacitors (which occupy relatively small areas).

For ease of illustration only one plate of each switched capacitors was shown connected via switches and the other end connected to a reference potential. It should be evident that both plates of the capacitors could be switched.

What is claimed is:

1. In a pattern recognition system the combination comprising:
   a multiplexer having N inputs and an output, each one of said N inputs being adapted to receive an input signal;
   M band pass filters, each filter having a signal input connected to said multiplexer and a signal output, and each filter including a capacitor $C_{Fi}$ and means for switching the capacitor at a particular frequency $f_{Fi}$ for producing a desired particular equivalent resistance within each filter, where $1 \leq i \leq M$;
   means connecting said filter signal inputs to said multiplexer output;
   M integrators, one integrator per filter, each integrator having a signal input and a signal output and each integrator including a capacitor $C_{Ii}$ and means for switching the capacitor at a particular frequency $f_{Ii}$ for producing a desired particular equivalent resistance within each integrator;
   M rectifying means, one rectifying means per filter, each rectifying means being connected between the signal output of a filter and the signal input of an integrator;
   a summing amplifier having a summing node; and
   M weighting elements, one weighting element per integrator, each weighting element having a signal input and a signal output and including a capacitor $C_{Wi}$ and means for switching the capacitor at a particular frequency $f_{Wi}$ for producing a desired particular equivalent resistance in the signal path between said signal input and said signal output of each weighting element;
   means connecting the signal input of each weighting element to its corresponding integrator output; and
   means connecting the signal output of each weighting element to said summing node; where M and N are integers greater than one.

2. The combination as claimed in claim 1 further including sampling signal generating means coupled to said filters, integrators, and weighting elements for switching the capacitors $C_{Fi}$, $C_{Ii}$ and $C_{Wi}$ at desired sampling frequencies.

3. The combination as claimed in claim 2 further including control means coupled to said sampling signal generating means for selectively controlling the frequency of the sampling signals applied to said capacitors $C_{Fi}$, $C_{Ii}$, and $C_{Wi}$.

4. The combination as claimed in claim 3 wherein said control means includes a microprocessor.

5. The combination as claimed in claim 1 wherein said M filters, said M rectifying means, said M integrators, and said M weighting elements are formed on a monolithic integrated circuit chip.

6. The combination as claimed in claim 1 wherein said summing amplifier has an output and further including a comparator circuit having a first input coupled to the output of said summing amplifier, a second input to which is applied a threshold voltage, and an output at which is produced an output signal indicative of the relationship of the summing amplifier output to the threshold voltage.

7. The combination as claimed in claim 2 wherein said sampling signal generating means comprises:
   an oscillator circuit, a filter control circuit, an integrator control circuit, and a weighting element control circuit, each control circuit for producing a group of M sampling signals in response to an oscillator signal, each group of sampling signals comprising signals of different frequencies;
   means coupled between said oscillator circuit and said filter, integrator and weighting element control circuits for applying signals generated by the oscillator to said control circuits for causing each said control circuit to produce a group of said sampling signals; and
   further including: means coupling said filter control circuit to said M filters for coupling the M separate sampling signals of the group of such signals produced by said filter control circuit to said M filters;
   means coupling said integrator control circuit to said M integrators for coupling the M separate sampling signals of the group of such signals produced by said integrator control circuit to said M integrators; and
   means coupling said weighting element control circuit to said weighting elements for coupling the M separate sampling signals of the group of such signals produced by said weighting element control circuit to the M weighting elements.

8. The combination as claimed in claim 7 further including;
   a microprocessor coupled to said oscillator and to control circuits for controlling the operation of said oscillator and said control circuits.

9. The combination as claimed in claim 8 further including means coupled between the output of the summing amplifier and the microprocessor for applying to the microprocessor a signal indicative of the signal applied to the filter inputs.

10. A pattern recognition circuit comprising:
 a multiplexer having N inputs and an output, each one of said N inputs being adapted to receive the output of a sensor;
 a programmable filter bank comprised of M band pass filters, each band pass filter having a signal input and a signal output, said signal inputs of said band pass filters being connected to said multiplexer output and each filter including at least one switched capacitor for forming the equivalent resistance of its RC time constant;
 a programmable integrating bank, comprised of M integrators, one integrator per filter, each integrator having a signal input and a signal output, each integrator including a switched capacitor for producing the equivalent resistance of the integrator's RC time constant;
 M rectifying means, one rectifying means per filter, each rectifying means being connected between the output of a filter and the input of an integrator;
 a summing amplifier having a summing node; and
 M programmable weighting elements, one weighting element per integrator, each weighting element comprising a switched capacitor connected between the output of its corresponding integrator and said summing node; where M and N are integers greater than one.

11. In a pattern recognition system including a plurality of filters coupled via a plurality of rectifying elements to a plurality of integrators which are coupled via a plurality of weighting elements to the summing node of an amplifier, and where each one of said filters, integrators and weighting elements has first and second circuit points between which an ohmic impedance is to be produced, the improvement comprising:
 a multiplicity of "switched" capacitors each one of said "switched" capacitors having first and second plates;
 each one of said plurality of filters, integrators and weighting elements including at least one "switched" capacitor coupled at one plate via a first switch means to its said first circuit point and via a second switch means to its said second circuit point for producing an equivalent ohmic impedance therebetween;
 means coupling the other plate of each one of said switched capacitors in circuit with other components of said plurality of filters, integrators and weighting elements; and
 means coupled to said switch means associated with said switched capacitors for controlling the rate at which said switch means are opened and closed for determining the equivalent resistance between the first and second circuit points associated with each switched capacitor.

* * * * *